United States Patent [19]

Ream

[11] 4,449,370
[45] May 22, 1984

[54] DIESEL ENGINE CATALYTIC COMBUSTOR SYSTEM

[75] Inventor: Lloyd W. Ream, N. Canton, Ohio

[73] Assignee: The United States of America as represented by the Administrator of the National Aeronautics and Space Administration, Washington, D.C.

[21] Appl. No.: 157,150

[22] Filed: Jun. 6, 1980

[51] Int. Cl.³ .................... F02B 37/00; F01N 3/36
[52] U.S. Cl. .................................... 60/606; 60/303
[58] Field of Search .................... 60/606, 280, 303

[56] References Cited

U.S. PATENT DOCUMENTS

| | | | |
|---|---|---|---|
| 2,216,494 | 10/1940 | Kurtz et al. | 60/606 |
| 2,585,029 | 2/1952 | Nettel | 60/606 |
| 2,669,090 | 2/1954 | Jackson | 60/606 X |
| 2,921,431 | 1/1960 | Sampietro | 60/606 |
| 3,048,005 | 8/1962 | Egli et al. | 60/606 X |
| 3,676,999 | 7/1972 | Oldfield | 60/606 |
| 3,775,971 | 12/1973 | Gadefelt | 60/606 X |
| 4,018,053 | 4/1977 | Rudert et al. | 60/606 |
| 4,054,418 | 10/1977 | Miller et al. | 60/303 X |
| 4,122,673 | 10/1978 | Leins | 60/280 X |
| 4,215,549 | 8/1980 | Daeschner | 60/606 |

FOREIGN PATENT DOCUMENTS

| | | | |
|---|---|---|---|
| 588160 | 12/1959 | Canada | 60/606 |
| 537483 | 6/1941 | United Kingdom | 60/606 |

*Primary Examiner*—Michael Koczo
*Attorney, Agent, or Firm*—N. Musial; J. Manning; J. Mackin

[57] ABSTRACT

The object of the invention is to provide a low compression turbocharged diesel engine in which the turbocharger can be operated independently of the engine to power auxiliary equipment. As shown in FIG. 1, fuel and air are burned in a catalytic combustor 17 to drive the turbine wheel of turbine section 11a which is initially caused to rotate by starter motor 9. By opening flapper valve 26, compressed air from blower section 11b is directed to catalytic combustor 17 when it is heated and expanded, serving to drive the turbine wheel and also to heat the catalytic element 32 shown in FIG. 2. To start engine 10, valve 26 is closed, combustion is terminated in catalytic combustor 17, and valve 20 is then opened to utilize air from blower 11b for air driven motor 21. When engine 10 starts, the constituents in its exhaust gas react in the catalytic element 32 and the heat generated provides additional energy for the turbine section 11a.

3 Claims, 2 Drawing Figures

DIESEL ENGINE CATALYTIC COMBUSTOR SYSTEM

DESCRIPTION

Origin of the Invention

The invention described herein was made by employees of the United States Government and may be manufactured and used by or for the Government for governmental purposes without the payment of any royalties thereon or therefor.

TECHNICAL FIELD

This invention relates to turbocharged internal combustion engines and is directed more particularly to a turbocharged diesel engine for aircraft use.

Because of the urgent need to reduce the amount of crude oil imported to the United States, a high priority has been placed on increasing the fuel economy of various internal combustion engines including those used in light aircraft. It is well-known that the brake specific fuel consumption for diesel engines is much lower than for spark ignition type gasoline engines.

For aircraft use, diesel engines are considered to be safer than spark ignition engines because no electrical ignition system is used and, consequently there are no misfires. Further, a diesel can be turbocharged to operate as efficiently at a 24,000 ft. altitude as it would at ground level, an advantage which cannot be achieved either by turbine engines or by supercharged gasoline engines which are generally limited to about three pounds per square inch supercharging pressure. Where a turbocharger is used, hot air can be bled through a diesel engine to prevent cooldown as would occur in a descent mode.

Probably the main disadvantage of a diesel engine as far as used in aircraft is its great weight which results from making the engine structure strong enough to withstand the pressures generated by compression ratios of 20 to 1 or more. However, by reducing the compression ratio to about 14 to 1 or as low as 8 to 1, the engine can be made very light. With such a low compression ratio, a turbocharger may be used to raise the intake air temperature to the 850° F. needed to provide auto-ignition in the diesel engine. However, for starting purposes some means must be provided to activate the turbocharger before the engine is running.

An important aspect of light aircraft usage is the availability of electrical power from the aircraft itself while on the ground with the engine off. A turbocharger which can be operated without the engine running can be used to drive an alternator or generator to provide the needed electrical power. The turbocharger can also be used to drive an oil pump for circulating oil through the diesel engine before attempting to start it.

BACKGROUND ART

In the prior art U.S. Pat. No. 4,018,053 discloses an internal combustion engine with an exhaust turbocharger and having an external auxiliary combustion chamber which provides hot gas to the exhaust system of the engine. The hot gas from the auxiliary combustion chamber is directed toward the turbine wheel thereby increasing its speed so as to provide increased starting-supercharged air pressure as well as additional pressure required under acceleration or heavy load.

U.S. Pat. No. 3,775,971 discloses a turbocharged internal combustion engine having an after-burner disposed in the exhaust system between the engine and the turbine of a turbocharger. Fuel may be injected into the after-burner to increase the energy of the turbine wheel. Valves are provided to supply additional amounts of air to the after-burner and to recirculate some of the exhaust gas to the intake system of the engine.

Neither of the above-identified patents involves any use of a catalytic combustion with a turbocharger to drive auxiliary equipment when an aircraft is parked on the ground with the engine off and the arrangements of both patents involve problems of flame-out and restarting with regard to the after-burner and auxiliary combustion chamber.

DISCLOSURE OF INVENTION

In accordance with the invention turbocharged, lightweight diesel engine is provided with a starter/alternator and an oil pump mechanically driven from a shaft through which the turbine wheel of a turbocharger drives the turbocharger blower and has a catalytic combustor disposed in the exhaust system between the engine and the turbine wheel. A by-pass conduit extends from the exhaust system at a point upstream of the catalytic combustor to an intake conduit extending between the blower of the turbocharger and the intake of the engine and is provided with a flapper valve which can be positioned either to block the by-pass conduit and open the intake conduit or vice-versa.

By positioning the by-pass conduit valve to open the by-pass conduit but block the intake conduit and by burning fuel in the catalytic combustor to heat the catalytic element, energy is supplied to the turbine wheel, thereby rotating the blower and driving the alternator and the oil pump. Air from the blower wheel is diverted through the by-pass conduit to the exhaust system and through the catalytic combustor and to the turbine wheel to the atmosphere.

After the catalytic element of the catalytic combustor achieves an operating temperature of approximately 400° F. or greater, the fuel input to the combustor may be varied as needed and even though reduced to zero the combustor will provide automatic restart without any ignition device such as a spark. Also, during operation of the engine there is sufficient oxygen in the exhaust gas so that no air need be supplied to the combustor from an external source to support combustion.

BRIEF DESCRIPTION OF THE DRAWINGS

The details of the invention will be described in connection with the accompanying drawings in which.

BEST MODE FOR CARRYING OUT THE INVENTION

Figure 1:
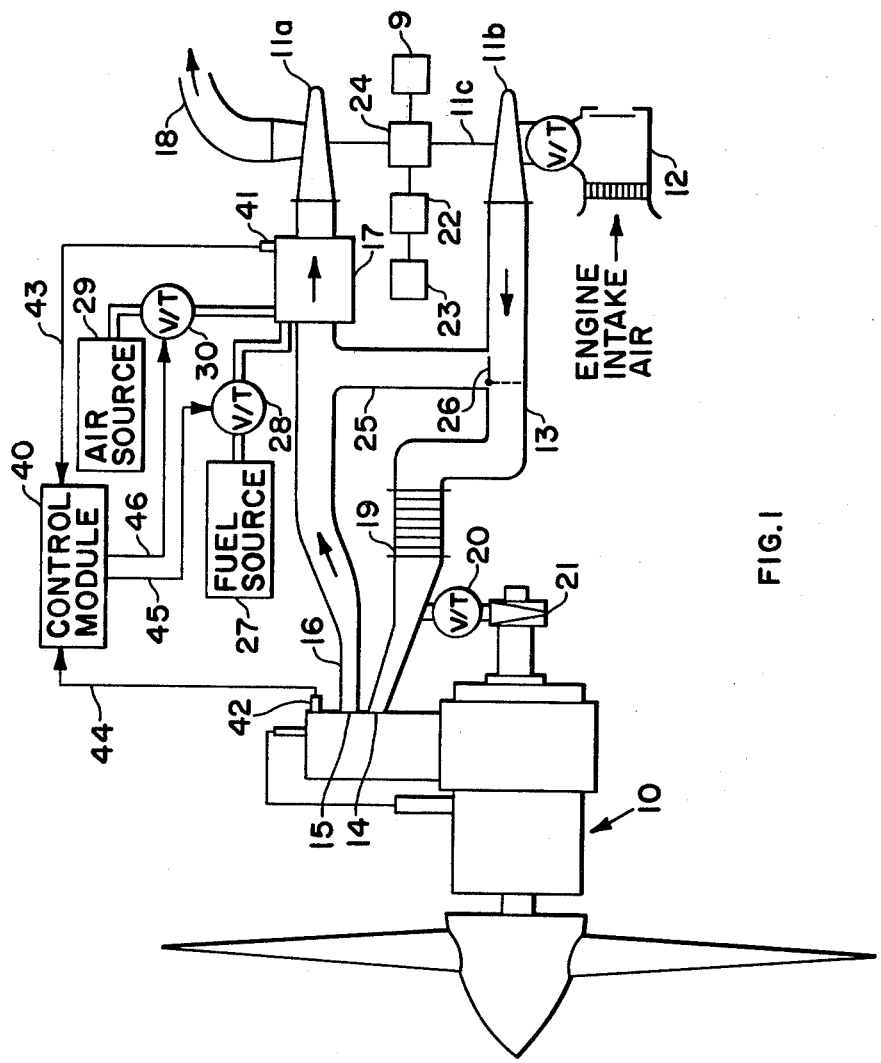
FIG. 1 is a schematic drawing of a turbocharged engine embodying the invention.

Referring first to FIG. 1, there is shown an intermittent combustion engine 10 having a turbocharger comprised of a turbine wheel section 11a, a blower section 11b, and a means for connecting the turbine to drive the blower such as shaft 11c. Air taken in at an air intake 12 is compressed and raised in temperature by the blower wheel section 11b and is directed by an intake conduit 13 to an intake port 14 of the engine 10. Exhaust gases from the engine 10 exit at exhaust port 15 and pass through an exhaust conduit 16, a catalytic combustor 17, the turbine section 11a and then through an exhaust outlet 18 to atmosphere.

The temperature of the intake air may be kept within a desired range by a intercooler 19 disposed in the intake conduit. Also, compressed air may be tapped off from the intake conduit 13 through a valve 20 to a pneumatic starter motor 21 to provide cranking power for engine 10. Further, by running the turbocharger while engine 10 is inoperative, accessory equipment such as an oil pump 22 and a generator 23 may be driven from the shaft 11c by means of various known mechanical devices as, for example, a gear box 24. With this arrangement it is necessary to provide a means such as a starter motor 9 to rotate the turbine wheel and blower initially. Alternatively, starter 9, gear box 24, oil pump 22 and generator 23 may be replaced by an alternator-oil pump in shaft 11c. The alternator serves as a starter motor when electrical power is supplied thereto.

To the end that turbine section 11a will drive accessories 22 and 23 and the blower 11b while engine 10 is inoperative, a bypass conduit 25 is connected from the exhaust conduit 16 upstream of catalytic combustor 17 to the intake conduit 13. In order to block the intake conduit 13 and direct air from the blower 11b through the by-pass conduit 25 to the combustor when the turbocharger is to be operated while engine 10 is inactive, a flapper valve 26 is positioned at the juncture of by-pass conduit 25 and intake conduit 13.

When engine 10 is inoperative, hot gas is supplied from the catalytic combustor 17 to the turbine section 11a by burning fuel in the combustor 17. This fuel is supplied from a fuel source 27 through a valve 28. Air to support the combustion is supplied from an air source 29 through a valve 30 to the catalytic combustor 17.

Figure 2:
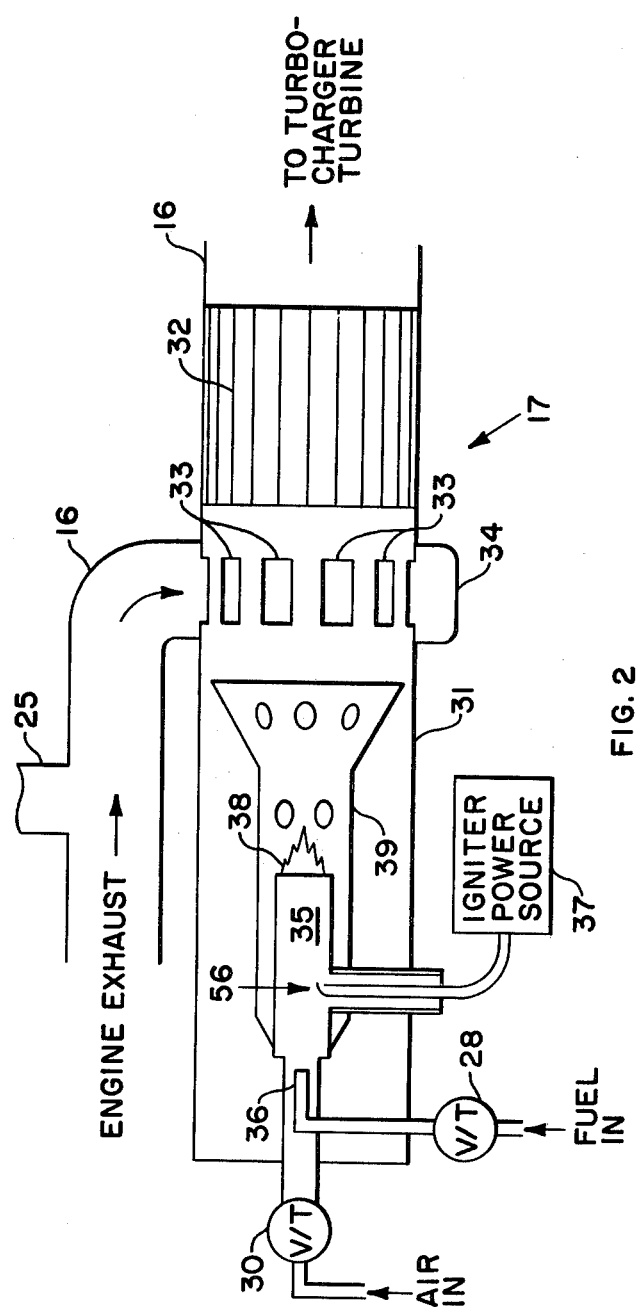
FIG. 2 is a schematic of a catalytic combustor of the type used in the arrangement of FIG. 1.

Referring now to FIG. 2 there is shown in schematic detail a catalytic combustor in accordance with the invention. Catalytic combustor 17 comprises a housing 31 closed at one end and having a catalytic element 32 disposed in an open end, the open end being connected through exhaust conduit 16 to the turbocharger turbine section 11a. The catalytic element 32 may be of palladium or other noble metals capable of reacting the constituents of exhaust gas from an internal combustion engine. Apertures or slots 33 are provided in the housing 31 and are enclosed within an annular manifold 34 which receives exhaust gas from exhaust conduit 16 or air from by-pass conduit 25.

Between the apertures 33 and the closed end of housing 31 there is disposed a combustion chamber 35 into which fuel is injected by a fuel nozzle 36. Air is supplied to combustion chamber 33 from valve 30. The fuel spray from injector 36 is ignited in combustion chamber 35 by a spark gap 56 energized from an igniter power source 37 to produce a flame 38. A flameholder 39 is disposed coaxially with the combustion chamber 35 to inhibit flameout conditions and to distribute the hot gas generated by the flame uniformly to the catalytic element 32.

Operation of the engine 10 and turbocharger system of FIG. 1 will now be described. Assuming that engine 10 is inoperative, the turbocharger section 11a may be energized activating starter motor 9 and by providing fuel and air to the catalytic combustor 17 to produce hot gas. Rotation of the turbine wheel of turbine section 11a drives not only the blower wheel of blower section 11b but also the oil pump 22 and the generator 23.

With flapper valve 26 positioned to block intake conduit 13, compressed air from the blower 11b is directed through by-pass conduit 25 to the catalytic combustor 17 where it is further raised in temperature and heats the catalytic element 32 before passing through turbine wheel section 11a and out through exhaust outlet 18. After the catalytic element 32 is brought up to about 400° F., the fuel and air to the catalytic combustor 17 are adjusted by means of valves 28 and 30 to provide the desired thermal output from the combustor.

After catalytic element 32 is up to the desired temperature, flapper valve 26 is positioned to close the by-pass conduit 25 and open intake conduit 13. Compressed air from the blower section 11b may be bled off from intake conduit 13 to a pneumatic motor 21 by opening valve 20. The compressed air to motor 21 causes it to crank the engine 10 until the latter starts.

After engine 10 starts, valve 30 may be closed, shutting off air to the catalytic combustor 17 since the exhaust gas normally contains sufficient oxygen to support combustion in the catalytic combustor. Eventually valve 28 may also be closed because the catalytic element 32 adds additional heat to the exhaust gas and, consequently, provides additional power to drive the turbine wheel of turbine section 11a.

Whenever needed, fuel and air can again be provided to the catalytic combustor to provide additional heating of the exhaust gas. To avoid manual control of valves 28 and 30, a control module 40 may be provided as shown in FIG. 1. Input signals are directed to control module 40 from a temperature sensor 41 in catalytic combustor 17 and from an engine running sensor 42 on engine 10 via leads 43 and 44, respectively. Sensor 42 may be, for example, a switch which energizes module 40 from a battery or it may take the form of a generator which provides electrical power to module 40 when engine 10 is operating. Control signals are supplied from control module 40 to valves 28 and 30 via leads 45 and 46, espectively. The temperature sensor 41 signal causes control module 40 to gradually close valves 28 and 30 as the catalytic element 32 (FIG. 2) approaches its normal operating temperature. When engine 10 is started, sensor 42 signals control module 40, whereby if the catalytic element of catalytic converter 17 is up to its normal temperature, both valves 28 and 30 will close. The catalytic element is kept hot by the reactive constituents in the exhaust gas from engine 10.

It will be understood that those skilled in the art to which the invention pertains may make various changes and modifications to the above described invention without departing from the spirit and scope thereof as set forth in the claims appended hereto.

I claim:

1. In combination with an intermittent combustion engine of the type having a turbocharger with a turbine wheel driven by engine exhaust gases directed thereto by an exhaust conduit and with a blower which provides air under pressure to said engine through an intake conduit, said blower being mechanically connected to said turbine:

(1) a catalytic combustor disposed in said exhaust conduit, and comprising:
an elongated housing having a closed end and an open end, said open end communicating with said turbine wheel, and further having slots which communicate with said engine through said exhaust conduit, said slots being disposed in said housing in the form of an annular row;
a catalytic element disposed at the open end of said catalytic combustor;

a cylindrical combustion chamber disposed between the closed end of said elongated housing and said slots which communicate with said engine;

means for injecting fuel into said combustion chamber;

means for injecting air into said combustion chamber;

means for igniting said fuel injected into said combustion chamber;

a flared apertured tube disposed coaxially outwardly of said combustion chamber and extending toward said slots which communicate with said engine to inhibit flameout and to uniformly heat said catalytic element;

(2) a fuel supply connected to said means for injecting fuel through a first valve which may be closed to terminate injection of fuel into said combustion chamber;

(3) an air supply connected to said means for injecting air through a second valve which may be closed to terminate injection of air into said combustion chamber;

(4) means for automatically adjusting said first and second valves when said catalytic element attains a predetermined temperature whereby overheating of said catalytic element is prevented;

(5) means coacting with said means for adjusting said first and second valves to close said first and second valves when said catalytic element is at or above a temperature of 400° F. and said engine is operating whereby combustor restart is automatic when said first and second valves reopen; and, (6) an intercooler disposed in said intake conduit to reduce the temperature of the air being provided to said engine.

2. The engine-turbocharger system of claim 1 wherein said catalytic element is selected from the group of noble metals which will minimize hydrocarbon emissions from the exhaust conduit by catalyzing a chemical reaction between the constituents of the exhaust gas.

3. The engine-turbocharger system of claim 2 wherein said catalytic element is palladium.

* * * * *